(12) United States Patent
Burt et al.

(10) Patent No.: US 7,087,859 B2
(45) Date of Patent: Aug. 8, 2006

(54) STICK ELECTRODE

(75) Inventors: Randall M. Burt, Mentor, OH (US); Jon P. Chiappone, Willoughby, OH (US)

(73) Assignee: Lincoln Global, Inc., Santa Fe Springs, CA (US)

(*) Notice: Subject to any disclaimer, the term of this patent is extended or adjusted under 35 U.S.C. 154(b) by 154 days.

(21) Appl. No.: 10/840,701

(22) Filed: May 6, 2004

(65) Prior Publication Data
US 2005/0247688 A1   Nov. 10, 2005

(51) Int. Cl.
B23K 35/02 (2006.01)
(52) U.S. Cl. ............... 219/145.1; 219/145.23; 219/146.52
(58) Field of Classification Search ......... 219/145.1, 219/145.23, 146.52, 145.41, 146.1, 146.23, 219/146.32, 146.51
See application file for complete search history.

(56) References Cited

U.S. PATENT DOCUMENTS

| | | | | |
|---|---|---|---|---|
| 2,909,778 A | * | 10/1959 | Landis et al. | 219/146.3 |
| 3,542,998 A | * | 11/1970 | De Huff | 219/146.52 |
| 3,778,588 A | * | 12/1973 | Bishel | 219/146.52 |
| 4,673,796 A | * | 6/1987 | Kiilunen | 219/145.22 |
| 6,153,847 A | * | 11/2000 | Nakatani et al. | 219/72 |
| 6,608,286 B1 | * | 8/2003 | Jiang | 219/145.31 |
| 6,939,413 B1 | * | 9/2005 | Crockett | 148/23 |

* cited by examiner

Primary Examiner—M. Alexandra Elve
(74) Attorney, Agent, or Firm—Fay Sharpe Fagan Minnich & McKee; Brian E. Turung

(57) ABSTRACT

A welding electrode comprising a metal core and a flux coating at least partially coated on an outer surface of said metal core, and also including a end coating material which at least partially inhibits porosity of a weld bead formed during the welding operation.

51 Claims, 1 Drawing Sheet

STICK ELECTRODE

The present invention is in the general field of welding and more particularly directed to a stick electrode having improved weld bead formation properties.

BACKGROUND OF THE INVENTION

In the field of arc welding, the three (3) main types of arc welding are submerged arc welding (SAW), shielded metal arc welding (SMAW), and flux-cored arc welding (FCAW). In submerged arc welding, coalescence is produced by heating with an electric arc between a bare-metal electrode and the metal being worked. The welding is blanketed with a granular or fusible material or flux. The welding operation is started by striking an arc beneath the flux to produce heat to melt the surrounding flux so that it forms a subsurface conductive pool which is kept fluid by the continuous flow of current. The end of the electrode and the work piece directly below it become molten and molten filler metal is deposited from the electrode onto the work. The molten filler metal displaces flux pool and forms the weld. In shielded metal arc welding, shielding is by a flux coating instead of a loose granular blanket of flux. In flux-cored electrodes, the flux is contained within the metal sheath.

In the art of welding, much prior effort has been expended in developing flux compositions of the type having predetermined flux components intended to perform in predetermined manners. A large number of compositions have been developed for use as fluxes in arc welding both for use generally as welding fluxes and for use as a coating on a metallic core or within a sheath. Fluxes are utilized in arc welding to control the arc stability, modify the weld metal composition, and provide protection from atmospheric contamination. Arc stability is commonly controlled by modifying the composition of the flux. It is therefore desirable to have substances which function well as plasma charge carriers in the flux mixture. Fluxes also modify the weld metal composition by rendering impurities in the metal more easily fusible and providing substances which these impurities may combine with in preference to the metal to form slag. Other materials may be added to lower the slag melting point, to improve slag fluidity, and to serve as binders for the flux particles.

One problem encountered with welding with stick electrodes is the resultant porosity of the weld metal, especially at the beginning of the welding process. At the start of the weld process using a stick electrode, the heat transferred to the tip of the electrode is initially relatively low and then increases rapidly. As a result, at the start of the welding process, some of the stick electrode melts and is transferred to the workpiece to begin the formation of a weld bead. Although the initial heating of the tip of the electrode is sufficient to melt the internal wire rod of the stick electrode, the initial heat is insufficient to heat the coating sufficiently on the electrode, which coating provides a shielding gas during the welding operation. The shielding gas generated the coating produces an environment about the weld metal that inhibits or prevents oxygen and nitrogen from dissolving in the weld metal, which dissolved gases may subsequently be expelled from the weld metal during the cooling of the weld bead. The expulsion of these gasses from the weld metal can result in porosity in the weld metal which in turn can result in an inferior weld bead. As a result, at the being of the welding process, the metal transferred to the workpiece can have an unacceptable amount of porosity which can result in a reduction in the weld bead quality.

In view of the problems of weld bead porosity associated with prior art stick electrodes, there remains a need for a stick electrode that forms a high quality weld bead throughout the welding process.

SUMMARY OF THE INVENTION

The present invention pertains to welding electrodes, and more particularly, to a welding electrode that includes an electrode coating which at least partially protects a weld metal from oxygen and nitrogen throughout the welding process. The electrode coating of the present invention is particularly directed to self-shielding stick electrodes having a metal rod coated with a flux composition; however, the electrode coating can be applied to other types of electrodes (e.g., flux cored electrodes, etc.). The electrode coating includes a flux composition and an end coating material. The flux composition and the end coating material include one or more distinct components. The end coating material is formulated to inhibit or prevent porosity problems that can occur in the formed weld bead during the beginning of the welding operation. The flux composition is formulated to generate a shielding gas to at least partially shield the weld metal from the atmosphere.

In another and/or alternative aspect of the present invention, the composition of the metal rod is selected to at least closely match the desired weld metal composition. Typically the metal rod includes a majority of iron when welding a ferrous based workpiece (e.g., carbon steel, stainless steel, etc.); however, the composition of the weld rod can include various types of metals to achieved a particular weld bead composition. The metal rod is typically a solid metal rod; however, the metal rod can be a cored metal rod. If the metal rod includes a core, the core can be vacant, included one or more alloying agents, include one or more flux agents, or include one or more flux and/or alloying agents.

In still another and/or alternative aspect of the present invention, the flux composition includes a binder, one or more conductive materials, and one or more weld metal protection compounds. The components of the flux composition can include metal oxides (e.g., aluminum oxide, boron oxide, calcium oxide, chromium oxide, iron oxide, magnesium oxide, niobium oxide, potassium oxide, silicon dioxide, sodium oxide, tin oxide, titanium oxide, vanadium oxide, zirconium oxide, etc.), metal carbonates (e.g., calcium carbonate, etc.), metal fluorides(e.g., barium fluoride, bismuth fluoride, calcium fluoride, potassium fluoride, sodium fluoride, Teflon, etc.), and/or metal alloying agents (e.g, aluminum, boron, calcium, carbon, chromium, iron, manganese, nickel, silicon, titanium, zirconium, etc.) that are combined with the binder. In one embodiment of the invention, the binder is formulated to secure the flux composition to the outer surface of the wire rod. In another and/or alternative embodiment of the invention, the binder includes silicates (e.g., silicon silicate, potassium silicate, etc.); however, other or additional binders can be used. Examples of silicate binders are disclosed in U.S. Pat. Nos. 4,103,067; 4,131,784; 4,208,563; 4,355,224; 4,741,974; 5,300,754 and 6,939,413, all which are incorporated herein by reference. As can be appreciated, other types binders can be used such as, but not limited to the binders disclosed in U.S. Pat. Nos. 4,103,067 and 4,662,952, which are incorporated herein by reference. Silicate binders are popular because of 1) their resistance to decomposition under conditions of use, 2) their binding strength, 3) their ability to be extruded at relatively high rates, 4) and their ability to form a hard film when dried, 5) their ease of handling, 6) their ability to be kneaded and mixed with other components, 7) their inexpensive material cost, etc. The use of silicates can also enhance the welding procedure such as, but not limited to, improving arc stability during welding, facilitating in forming a low melting point component, facilitating in adjusting the melting/freezing range of the slag. In yet another and/or alternative embodiment of the invention, the binder is coated and/or extruded onto the outer surface of the wire rod. The materials that are included in the flux composition are generally added to a liquid binder and then kneaded to a consistency that is appropriate for subsequent extrusion. The mass of kneaded mixture is commonly formed into "slugs" which facilitates in handling during the time of storage and the loading of presses with the mixture for the extrusion operation. The plasticity of the flux composition on the wire rod is at least partially controlled by the composition of the binder. In still yet another and/or alternative embodiment of the invention, flux composition is typically cut and then dried. Drying of the flux composition is generally carried out at a low temperature beginning at about 100–150° C. with controlled humidity in order to obtain uniform drying without cracking. This drying step is generally followed by one or more higher temperature drying steps at a lower humidity depending upon the nature of the flux composition. In a further and/or alternative embodiment of the invention, the binder constitutes at least about one (1%) weight percent of the flux composition after being dried. In one aspect of this embodiment, the binder constitutes about 1–80 weight percent of the flux composition after being dried. In a further and/or alternative embodiment of the invention, the flux composition includes one or more conductive materials that conduct current to facilitate in the melting of the end of electrode. Generally the conductive material is supplied as small particles to facilitate in the dispersement of the conductive material in the binder. These conductive materials include, but are not limited to, graphite, titanium, iron and/or iron alloys (e.g., Fe—Al, Fe—Mn, Fe—Si, Fe—Ti, etc.), aluminum, etc. In one aspect of this embodiment, the conductive material constitutes about 0.1–80 weight percent of the flux composition after being dried. In still a further and/or alternative embodiment of the invention, at least one of the weld metal protection compounds includes a gas generating compound that generate a shielding gas during the welding operation. The gas generating compounds generally decompose during the welding operation and release a gas that at least partially protects the weld metal (e.g., $CO_2$ generating compounds, fluoride generating compounds, etc.). In one aspect of this embodiment, the gas generating compound constitutes about 0.1–75 weight percent of the flux composition after being dried. In yet a further and/or alternative embodiment of the invention, the flux composition includes one or more alloying agents used to facilitate in forming a weld metal with the desired composition. In one aspect of this embodiment, the alloying agent constitutes about 1–75 weight percent of the flux composition after being dried. In still yet a further and/or alternative embodiment of the invention, the flux composition includes one or more, slag modifiers. In another and/or alternative embodiment of the invention, the flux composition includes one or more electric arc modifiers. In still another and/or alternative embodiment of the invention, the flux composition includes one or more fume production modifiers.

In yet another and/or alternative aspect of the present invention, the end coating material has a composition that is different from the flux composition and is positioned on the end region of the electrode. The end coating material can be at least partially coated 1) on the end of the metal rod, 2) on any exposed outer surface of the metal rod, and/or 3) on the surface of at least a portion of the flux composition. In one embodiment of the invention, the end coating material is at least partially formulated to inhibit or prevent porosity problems associated with the weld bead, especially at the beginning of the welding procedure. In one aspect of this embodiment, the end coating material is at least partially formulated to at least partially shield the weld metal from the atmosphere. The mechanism for such shielding can include, but is not limited to, at least partially increasing the surface tension of the metal droplets being formed and/or transferred to the workpiece, and/or at least partially forming a shielding environment about the metal droplets being formed and/or transferred to the workpiece. The mechanism for increasing the surface tension includes, but is not limited to, the formation of larger sized droplet formation molten metal on the end of the electrode which are transferred to the workpiece. These larger droplets reduce the amount of oxygen and/or nitrogen that can mix with the molten metal thereby reducing the porosity problems of the formed weld bead. The mechanism for forming a shielding environment includes, but is not limited to, the at least partial coating of the formed droplet of molten metal with a material that inhibits or prevents oxygen and/or nitrogen from penetrating into the droplet and/or into the molten metal on the workpiece. As can be appreciated, the end coating material can affect the surface tension of the formed droplet. The mechanism for forming a shielding environment can include, but is not limited to, the at least partial formation of a gas about the metal droplets formed and/or transferred to the workpiece. Generally the one or more compounds in the end coating material that at least partially shields the weld metal from the atmosphere are supplied as small particles to facilitate in the dispersement of the particles in the end coating material. The average size of the particles is generally no greater than about 150 mesh, and typically about 200–400 mesh. In yet another and/or alternative aspect of this embodiment, the one or more compounds in the end coating material that at least partially shields the weld metal from the atmosphere includes a fluoride compound. One non-limiting compound includes, but is not limited to $Na_3AlF_6$. One source of $Na_3AlF_6$ includes cryolite. In still another and/or alternative aspect of this embodiment, the one or more compounds that at least partially shield the weld metal constitutes about 0.05–70 weight percent of the end coating material prior to being dried. In yet another and/or alternative aspect of this embodiment, the one or more compounds that at least partially shield the weld metal constitutes about 1–65 weight percent of the end coating material prior to being dried. In still yet another and/or alternative aspect of this embodiment, the one or more compounds that at least partially shield the weld metal constitutes about 5–60 weight percent of the end coating material prior to being dried. In a further and/or alternative aspect of this embodiment, the one or more compounds that at least partially shield the weld metal constitutes about 10–55 weight percent of the end coating material prior to being dried. In still a further and/or alternative aspect of this embodiment, the one or more compounds that at least partially shield the weld metal constitutes about 25–55 weight percent of the end coating material prior to being dried. In yet a further and/or alternative aspect of this embodiment, the one or more compound that at least partially shield the weld metal constitutes about 40–50 weight percent of the end coating material prior to being dried. In another and/or alternative embodiment of the invention, the end coating material includes one or more conducting materials. The conducting material is used to at least partially conduct current in and/or through the end coating material to facilitate in the melting of the end of electrode and the initiation and/or maintenance of the arc between the electrode and the workpiece. Generally the conducting material is supplied as small particles to facilitate in the dispersement of the conducting material in the end coating material. The average size of the conducting material particles is generally no greater than about 150 mesh, and typically about 200–400 mesh. The conducting material can include, but is not limited to, graphite, magnesium, titanium, iron and/or iron alloys (e.g., Fe—Al, Fe—Mn, Fe—Si, Fe—Ti, etc.), aluminum, etc. In one aspect of this embodiment, the conducting material constitutes about 0–70 weight percent of the end coating material prior to being dried. In another and/or alternative aspect of this embodiment, the conducting material constitutes about 0–60 weight percent of the end coating material prior to being dried. In still another and/or alternative aspect of this embodiment, the conducting material constitutes about 0.5–50 weight percent of the end coating material prior to being dried. In yet another and/or alternative aspect of this embodiment, the conducting material constitutes about 2–40 weight percent of the end coating material prior to being dried. In still yet another and/or alternative aspect of this embodiment, the conducting material constitutes about 5–30 weight percent of the end coating material prior to being dried. In a further and/or alternative aspect of this embodiment, the conducting material constitutes about 5–20 weight percent of the end coating material prior to being dried. In still another and/or alternative embodiment of the invention, the end coating material includes one or more binders to secure the components of the end coating material to the metal rod and/or flux coating on the metal rod. In one aspect of this embodiment, the one or more binders in the conducting material constitutes about 1–70 weight percent of the end coating material prior to being dried. In another and/or alternative aspect of this embodiment, the one or more binders constitutes about 1–60 weight percent of the end coating material prior to being dried. In still another and/or alternative aspect of this embodiment, the one or more binders constitutes about 2–50 weight percent of the end coating material prior to being dried in yet another and/or alternative aspect of this embodiment, the one or more binders constitutes about 4–40 weight percent of the end coating material prior to being dried. In still yet another and/or alternative aspect of this embodiment, the one or more binders constitutes about 5–35 weight percent of the end coating material prior to being dried. In a further and/or alternative aspect of this embodiment, the one or more binders constitutes about 10–30 weight percent of the end coating material prior to being dried. In still a further and/or alternative aspect of this embodiment, the one or more binders constitutes about 15–30 weight percent of the end coating material prior to being dried. The one or more binders can include a variety of compounds. The composition of the one or more binders can be the same as or different from the one or more binders used in the flux composition. In one non-limiting formulation of a binder, the one or more binders can include one or more silicates (e.g., potassium silicate, sodium silicate, etc.). In another and/or alternative non-limiting formulation of a binder, the one or more binders can include a micro emulsion of silicon dioxide. The silicon dioxide can be in a pure and/or unpure form. Examples of unpure forms of silicon dioxide include, but are not limited to, quartz, feldspar, mica, biotite, olivine, hornblende, muscovite, pyroxenes, and/or other sources of silicon dioxide. The one or more binders generally includes a liquid content. The liquid content of the one or more binders is typically about 2–80 weight percent of the one or more binders, more typically about 10–75 weight percent of the one or more binders, even more typically about 25–70 weight percent of the one or more binders, still even more typically about 40–70 weight percent of the one or more binders. In yet another and/or alternative embodiment of the invention, the end coating material includes a liquid component prior to the end coating material being dried. The liquid component is liquid that is not associated with the one or more binders. The liquid component is generally used to disperse the components of the end coating material in solution so that the end coating material can be applied to the electrode. Generally, the liquid component primarily includes water; however, additional and/or alternative liquids can be used. The liquid facilitates in suspending the particles of the end coating material and/or facilitates in the application of the end coating material on the electrode. In one aspect of this embodiment, the liquid component constitutes about 0–70 weight percent of the end coating material prior to being dried. In another and/or alternative aspect of this embodiment, the liquid component constitutes about 1–50 weight percent of the end coating material prior to being dried. In still another and/or alternative aspect of this embodiment, the liquid component constitutes about 2–40 weight percent of the end coating material prior to being dried. In yet another and/or alternative aspect of this embodiment, the liquid component constitutes about 8–30 weight percent of the end coating material prior to being dried. In still yet another and/or alternative aspect of this embodiment, the liquid component constitutes about 10–25 weight percent of the end coating material prior to being dried. In still yet another and/or alternative embodiment of the invention, the end coating material includes a coloring agent to modify the color of the end coating material. In some applications, it may be desirable to have the end coating material closely match the flux coating on the electrode. In other applications, it may be desirable to have the color of the end coating material differ from the flux coating on the electrode. Many different types of coloring agents can be used (e.g., carbon black, titanium dioxide, iron oxides, etc.). On coloring agent that can be used is titanium dioxide. Titanium dioxide typically adds a white pigment to the end coating material when used, thereby lightening the color of the end coating material. As can be appreciated, other and/or additional coloring agent can be used to obtain a wide variety of colors for the end coating material. In one aspect of this embodiment, the coloring agent constitutes about 0–15 weight percent of the end coating material prior to being dried. In another and/or alternative aspect of this embodiment, the coloring agent constitutes about 0–10 weight percent of the end coating material prior to being dried. In still another and/or alternative aspect of this embodiment, the coloring agent constitutes about 0–8 weight percent of the end coating material prior to being dried. In yet another and/or alternative aspect of this embodiment, the coloring agent constitutes about 0–5 weight percent of the end coating material prior to being dried. In still yet another and/or alternative aspect of this embodiment, the coloring agent constitutes about 0.1–4 weight percent of the end coating material prior to being dried.

In still yet another and/or alternative aspect of the present invention, the end coating material is applied to the electrode prior to and/or after the flux composition is applied to the wire rod. In one embodiment of the invention, the end coating material is applied to the electrode at least partially after the flux composition is applied. When the end coating material is applied to the electrode after the flux composition is at least partially applied, the end coating material is generally applied after the flux composition is at least partially dried; however, this is not required. In another and/or alternative embodiment of the invention, the end coating material can be applied to the electrode by a variety of mechanisms such as, but not limited to, spray coating, dipping, rolling, brush coating, etc. One or more coating mechanism can be used to apply one or more coatings of the end coating material on the electrode. In still another and/or alternative embodiment of the invention, the average coating thickness of the end coating material is at least about 0.0001 inch. In one aspect of this embodiment, the average coating thickness of the end coating material is about 0.0005–0.15 inch. In another and/or additional aspect of this embodiment, the average coating thickness of the end coating material is about 0.001–0.1 inch. In still another and/or additional aspect of this embodiment, the average coating thickness of the end coating material is about 0.001–0.05 inch. In yet another and/or additional aspect of this embodiment, the average coating thickness of the end coating material is about 0.002–0.02 inch. In still yet another and/or additional aspect of this embodiment, the average coating thickness of the end coating material is about 0.002–0.01 inch. In still yet another and/or alternative embodiment of the invention, the average coating thickness of the end coating material at the front end of the electrode is the same as or greater than the average thickness of the end coating material on the side of the electrode. In one aspect of this embodiment, the average coating thickness of the end coating material at the front end of the electrode is substantially the same as the average thickness of the end coating material on the side of the electrode. In another and/or alternative aspect of this embodiment, the average coating thickness of the end coating material at the front end of the electrode is greater than the average thickness of the end coating material on the side of the electrode. In one non-limiting design, the average coating thickness of the end coating material at the front end of the electrode is about 1.01–4 times greater than the average thickness of the end coating material on the side of the electrode. In still yet another and/or alternative embodiment of the invention, the average length of the coating of the end coating material starting from the end of the electrode at least about 0.01 inch. In one aspect of this embodiment, the average length of the coating of the end coating material starting from the end of the electrode is about 0.05–4 inches. In another and/or alternative aspect of this embodiment, the average length of the coating of the end coating material starting from the end of the electrode is about 0.1–2 inches. In still another and/or alternative aspect of this embodiment, the average length of the coating of the end coating material starting from the end of the electrode is about 0.1–0.5 inch. In a further and/or alternative embodiment of the invention, the color of the end coating material is different from the color of the wire rod and/or flux composition. The different color of the end coating material can be used to visually indicate one or more properties of the electrode such as, but not limited to, 1) the fact that the electrode includes an end coating material, 2) the integrity of the end coating material, 3) the type of end coating material, 4) the type of electrode, 5) the type of flux system on the electrode, 6) the type of wire rod in the electrode, etc. In still a further and/or alternative embodiment of the invention, the viscosity of the end coating material prior to being dried is selected to obtain the desired coating on the electrode. In one aspect of this embodiment, the viscosity of the end coating material is at least about 50 cps @ 20° C. In another and/or alternative aspect of this embodiment, the viscosity of the end coating material is about 100–500000 cps @ 20° C. In still another and/or alternative aspect of this embodiment, the viscosity of the end coating material is about 100–100000 cps @ 20° C. In yet another and/or alternative aspect of this embodiment, the viscosity of the end coating material is about 150–50000 cps @ 20° C. In still yet another and/or alternative aspect of this embodiment, the viscosity of the end coating material is about 200–10000 cps @ 20° C.

In a further and/or alternative aspect of the present invention, the end of the electrode is treated to at least partially remove and/or bevel the flux composition on end of the electrode prior to the end coating material being applied to the end region of the electrode. The at least partial removal of the flux composition from the end of the electrode can be accomplished by one or more mechanisms such as, but not limited to, sanding, grinding, cutting, dissolving, etc. In one embodiment, the flux coating is at least partially removed from the end region of the rod a distance of up to about 1.5 inches from the end of the metal rod, and typically about 0.05–1 inches from the end of the metal rod. When the flux coating is beveled, the beveled angle is about 25–70°, and typically about 30–60°.

It is a principal object of the present invention to provide improved protection to a weld bead, especially at the beginning of a welding procedure.

Another and/or alternative object of the present invention is the provision of a consumable electrode that reduces the porosity of a weld bead, especially at the beginning of a welding procedure.

Still and/or alternative object of the present invention is the provision of a consumable electrode that includes a coating that provides shielding to a weld bead.

Yet another and/or alternative object of the present invention is the provision of a consumable electrode that includes an end coating material at least at the end of the electrode that provides shielding to a weld bead.

A further and/or alternative object of the present invention is the provision of a consumable electrode that includes an end coating material that is different from the flux composition of the electrode.

Still a further and/or alternative object of the present invention is the provision of a consumable electrode that includes an end coating material that has a different color that the exterior of the metal rod and/or a flux composition on the metal rod.

These and other objects and advantages will become apparent from the discussion of the distinction between the invention and the prior art and when considering the preferred embodiment as shown in the accompanying drawings.

BRIEF DESCRIPTION OF THE INVENTION

Figure 1:
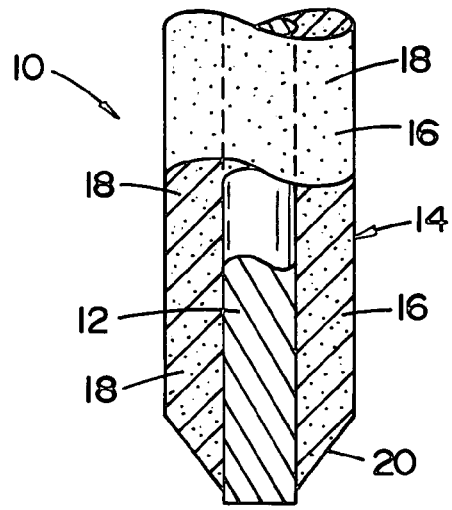
FIG. 1 is an enlarged sectional view of the end portion of a prior art stick electrode having a flux coating on a metal rod.

Referring now in greater detail to the drawings, wherein The showings are for the purpose of illustrating preferred embodiments of the invention only, and not for the purpose of limiting the invention, FIG. 1 illustrates a lower sectional portion of a prior art stick electrode 10. The stick electrode includes a solid metal rod 12 and a flux coating 14 coated on the exterior surface of the metal rod. The flux coating generally includes a binder that secures a flux agent 16 and/or metal alloying agent 18 to the metal rod. The components of the flux agent typically include metal oxides (e.g., aluminum oxide, boron oxide, calcium oxide, chromium oxide, iron oxide, magnesium oxide, niobium oxide, potassium oxide, silicon dioxide, sodium oxide, tin oxide, titanium oxide, vanadium oxide, zirconium oxide, etc.), metal carbonates (e.g., calcium carbonate, etc.), and/or metal fluorides (e.g., barium fluoride, bismuth fluoride, calcium fluoride, potassium fluoride, sodium fluoride, Teflon, etc.). The metal alloying agents can include a variety of metals (e.g, aluminum, boron, calcium, carbon, iron, manganese, nickel, silicon, titanium, zirconium, etc.). The particular components of the flux coating and/or metal alloying agents generally depend on the type of welding process (SAW, SMAW, FCAW) to be used and/or the type of workpiece to be welded and the composition of the weld bead to be formed. The end of region of the stick electrode is shown to be tapered 20; however, this is not required.

Figure 2:
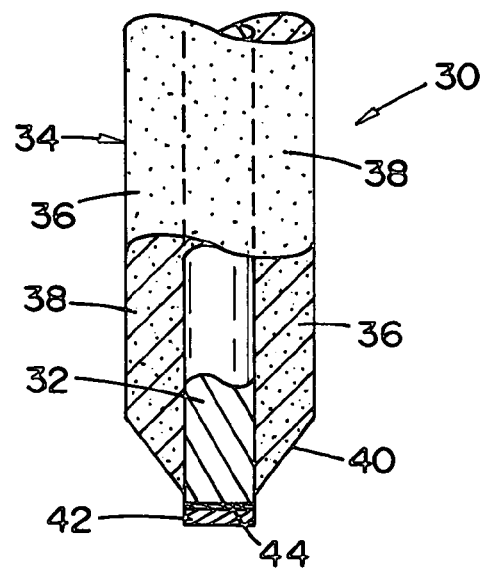
FIG. 2 is an enlarged sectional view of the end portion of another prior art stick electrode having a flux coating on a metal rod and a graphite plug attached to the end of the metal rod.

Referring now to FIG. 2, a lower sectional portion of another prior art stick electrode 30 is illustrated. The stick electrode includes a solid metal rod 32 and a flux coating 34 coated on the exterior surface of the metal rod. The flux coating generally includes a binder that secures a flux agent 36 and/or metal alloying agent 38 to the metal rod. The end of region of the stick electrode is shown to be tapered 40; however, this is not required. A graphite plug 42 is secured to the end of the stick electrode by a binder 44. The graphite plug was typically used to assist in staring the arc between the end of the stick electrode and the workpiece.

Figure 3:
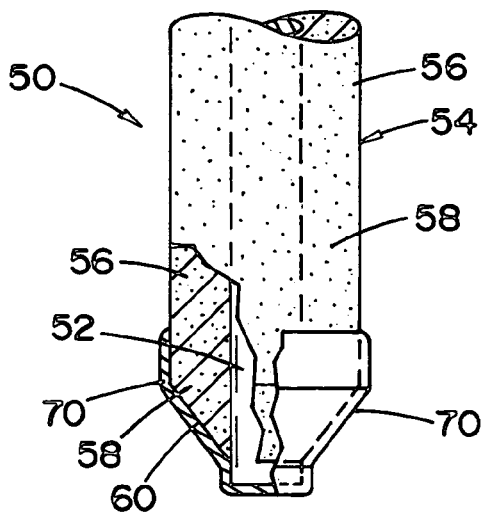
FIG. 3 is an enlarged sectional view of the end portion of a stick electrode in accordance with the present invention; and, FIG. 4 is an enlarged sectional view of the end portion of another stick electrode in accordance with the present invention.

Referring now to FIG. 3, there is illustrated a stick electrode in accordance with the present invention. The stick electrode 50 includes a metal rod 52 which may be a solid metal rod or a cored metal rod. Coated on the exterior surface of the metal rod is a flux coating 54 which includes a binder to secure a flux agent 56 and one or more metal alloying agents 58 to the metal rod. The flux coating is illustrated as being tapered 60 near the front end of the metal rod. The taper has an angle of about 35–50°. Coated on the front end of the metal rod ad partially on the lower end of the flux coating is an end coating material 70. The end coating material has a different composition from the flux coating 54. The end coating material is designed to reduce the porosity of the weld bead during the initial formation of the weld bead. It has been found that at the beginning of a welding process, the flux coating may not provide adequate shielding against the oxygen and nitrogen in the air, thereby resulting in such components becoming dissolved into the weld metal during a welding process. As the weld metal cools, the oxygen and nitrogen are re-released into the atmosphere, thereby causing porosity problems in the weld bead which can compromise the quality and/or strength of the weld bead. End coating material 70 is formulated to provide protection to the weld bead at the beginning of the welding process. Typically, the end coating material includes a fluoride compound that intermingles with the molten metal formed form the heated tip for the stick electrode. The fluoride in the fluoride compound increases the surface tension of the molten metal droplets thereby decreasing the amount of dissolved oxygen and nitrogen which can intermix with the molten metal in the freshly formed weld bead. As a result of the reduction of dissolved oxygen and nitrogen in the weld bead, the incidence of porosity in the weld bead is significantly reduced, thereby enhancing the quality and/or strength of the weld bead. As shown in FIG. 3, end coating material 70 is only partially coated on the end of the stick electrode. Typically, the length of coating of the end coating material from the end of the stick electrode is up to no more than 2 inches, typically no more than about 1 inch, more typically no more than up to about 0.75 inch, and still more typically about 0.1–0.5 inch. The end coating material is principally needed during the initial formation of the weld bead, thus after about 0.2 to 0.50 inches of the stick electrode has been consumed, the shielding gas generated by the flux coating is sufficient to shield the formed weld bead from the atmosphere.

The end coating material includes a binder and a fluoride containing material. The binder is used to secure the shielding compound to the end of the stick electrode. The fluoride containing material provides shielding to the weld metal at the beginning of a welding procedure. The end coating material also typically includes an electrically-conductive material so as to facilitate in the conduction of current to the tip of the electrode which results in the heating and melting of the electrode during a welding procedure. The end coating material can also include a pigment to alter the color of the end coating material. A general formulation of the end coating material is about 1–70 fluoride compound, about 1–70 weight percent binder, about 0–70 weight percent conductive material, about 0–15 weight percent coloring agent, and about 0–70 weight percent liquid component. One specific formulation of the end coating material is about 35–55 fluoride compound, about 15–35 weight percent binder (binder includes about 50–70% liquid), about 1–20 weight percent conductive material, about 0–10 coloring agent, and about 5–30 weight percent liquid component (other than liquid in binder). Another specific formulation of the end coating material is about 40–50 fluoride compound (e.g., cryolite), about 15–35 weight percent silicate containing binder (binder includes about 50–70% liquid), about 5–15 weight percent conductive material (e.g., graphite, magnesium, Fe—Ti, etc.), about 0–6 weight percent coloring agent, and about 10–25 weight percent liquid component (other than liquid in binder). Still another specific formulation of the end coating material is about 40–50 cryolite, about 20–30 weight percent potassium silicate binder (binder includes about 55–65% water), about 5–15 weight percent graphite including conductive material, about 1–4 weight percent coloring agent (e.g., titanium oxide), and about 10–25 weight percent water (other than water in binder). A dried formulation of this particular end coating material is about 53.3–79.4 weight percent cryolite, about 9.30–21.5 weight percent potassium silicate binder, about 6.65–23.85 weight percent graphite including conductive material, and about 1.33–6.36 weight percent coloring agent. The average particle size of the components of the end coating material are selected to maintain such components in suspension for a sufficient period of time to enable the end coating material to be applied to the stick electrode. Typically the average size of the particles of the conductive material, when included in the end coating material, is no more than about 200 mesh so as to inhibit such particles from rapidly precipitating out of solution prior to the end coating material being applied to the stick electrode.

As illustrated in FIG. 3, the thickness of the end coating material is less than the thickness of the flux coating. Typically, the flux coating is extruded onto the metal rod 52, whereas the end coating material is sprayed, dipped and/or brush coated onto the end portion of the stick electrode. The average thickness of the end coating material is generally about 0.001–0.01 inch and typically about 0.002–0.008 inch.

Figure 4:
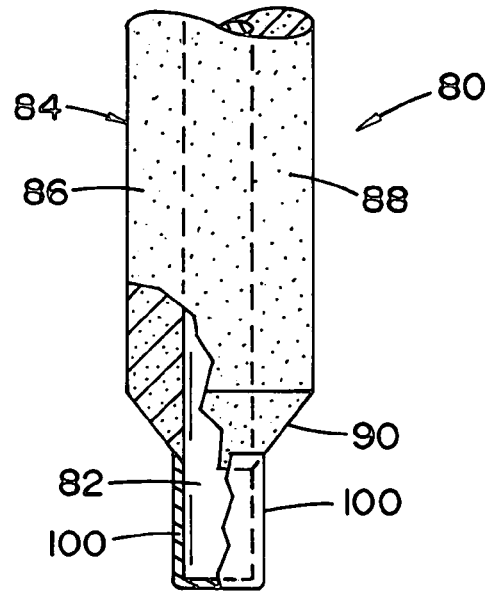

Referring now to FIG. 4, there is illustrated another stick electrode which is in accordance with the present invention. Stick electrode 80 includes a metal rod 82 which may be a solid metal rod or a cored metal rod. Coated onto the exterior of metal rod 82 is a flux coating 84. The flux coating generally includes a binder that secures one or more flux agents 86 and/or one or more metal alloying agents 88 to the outer surface of the metal rod. The flux coating 84 is illustrated as having a tapered edge 90 which is spaced at a greater distance from the end of the metal rod than shown in FIG. 3. Coated on the bare surface of the metal rod beginning generally at the end of the flux agent is an end coating material 100.

The stick electrodes in FIGS. 3 and 4 illustrate a stick electrode which does not include a graphite plug positioned at the end of the metal rod. As can be appreciated, a graphite plug or other plug of conductive material can be applied to the end of the stick electrode. Such a conductive plug material may or may not be coated with the end coating material.

The end coating materials illustrated in FIGS. 3 and 4 may have a similar color to the flux coating, or may have a different color from the flux coating. When a different coloring is used for the end coating material, such coating can be used to identify one or more properties of the electrode (e.g. type of electrode, composition of electrode, etc.). The use of a pigment in the end coating material can be used to obtain the desired coloring of the end coating material.

The end coating material is typically applied to the stick electrode after the flux coating has been applied but prior to the flux coating being fully dried; however, the end coating material can be applied after the flux coating has been dried. In one specific manufacturing process, the wire rod is directed toward a flux composition and the flux composition is extruded about the outer surface of the wire rod. The flux coated wire rod is then cut into sections of a certain length. The front end of the coated wire rod is ground to form a beveled end. The bevel end has a slope of about 30–50° and extends from the end of the coated wire rod to about 0.1–0.75 inch from the end of the coated wire rod, and typically to about 0.15–0.4 inch from the end of the coated wire rod. The flux coating at the other end of the coated wire rod is substantially removed to expose about 0.5–1.5 inches of the wire rod. After the treatment of the ends of the wire rod, the end coating material is spray coated on the beveled end of the coated wire rod. The average coating thickness of Lie end coating material is about 0.002–0.01 inch. The coating of the end coating material extends from the end of the coated wire rod up to about 0.5 inch past the end of the bevel in the flux coating. After the end coating material is applied, the coated wire rod is dried to substantially remove all the water in the flux coating and the end coating material. After the drying process, the stick electrode can be sealed in a container and/or wrapped to inhibit absorption of moisture while the stick electrode is stored.

These and other modifications of the discussed embodiments, as well as other embodiments of the invention, will be obvious and suggested to those skilled in the art from the disclosure herein, whereby it is to be distinctly understood that the foregoing descriptive matter is to be interpreted merely as illustrative of the present invention and not as a limitation thereof.

We claim:

1. A welding electrode comprising a metal core and a flux coating at least partially coated on an outer surface of said metal core, said flux coating including an electrically conductive material and a shielding material that at least partially shields a weld bead from oxygen, nitrogen, or combinations thereof as the weld bead is formed during a welding operation, said welding electrode including a front end portion that is at least partially coated with an end coating material which at least partially inhibits porosity of the weld bead formed during the welding operation, said end coating material at least partially having a different composition from said flux coating, said ending coating material including an electrically conductive material, said end coating material only partially coating an outer surface of said weld electrode, said end coating extending from a front end of said front end portion up to about 4 inches from said front end of said welding electrode.

2. The welding electrode as defined in claim 1, wherein said metal core is a solid metal rod.

3. The welding electrode as defined in claim 1, wherein said metal core includes a majority of iron.

4. The welding electrode as defined in claim 1, wherein said shielding material includes at least one gas generating compound.

5. The welding electrode as defined in claim 4, wherein said at least one gas generating compound is selected from the group consisting of metal fluoride, metal oxide, metal carbonate, or mixtures thereof.

6. The welding electrode as defined in claim 1, wherein said flux coating includes at least one metal alloying agent.

7. The welding electrode as defined in claim 1, wherein said end coating material includes at least one material to increase the surface tension of metal of the weld bead.

8. The welding electrode as defined in claim 7, wherein said at least material to increase the surface tension includes a fluoride compound.

9. The welding electrode as defined in claim 1, wherein said electrically conductive material of said end coating includes a material selected from the group consisting of aluminum, graphite, iron, iron alloys, magnesium, titanium, or combinations thereof.

10. The welding electrode as defined in claim 1, wherein said end coating material is at least partially coated on said flux coating.

11. The welding electrode as defined in claim 1, wherein said end coating material is a different color from said flux coating.

12. The welding electrode as defined in claim 1, wherein said end coating material extending from said front end up to about 1 inch from said front end of said welding electrode.

13. The welding electrode as defined in claim 1, wherein said end coating material has a lower viscosity when applied to said welding electrode than said flux coating when applied to said welding electrode.

14. A welding electrode comprising a metal core having a front end that is at least partially coated with an end coating material, said end coating material at least partially inhibiting porosity of a weld bead formed during the welding operation, said end coating material only partially coating an outer surface of said welding electrode, said end coating extending from said front end up to about 1 inch from said front end of said welding electrode, said end coating material including at least one material to increase the surface tension of metal of the weld bead.

15. The welding electrode as defined in claim 14, including a flux coating that is at least partially coated on an outer surface of said metal core, said flux coating including an electrically conductive material and a shielding material that at least partially shields a weld bead formed during a welding operation, said end coating material at least partially having a different composition from said flux coating.

16. The welding electrode as defined in claim 14, wherein said metal core is a solid metal rod.

17. The welding electrode as defined in claim 14, wherein said metal core includes a majority of iron.

18. The welding electrode as defined in claim 15, wherein said shielding material includes at least one gas generating compound.

19. The welding electrode as defined in claim 18, wherein said at least one gas generating compound is selected from the group consisting of metal fluoride, metal oxide, metal carbonate, or mixtures thereof.

20. The welding electrode as defined in claim 15, wherein said flux coating includes at least one metal alloying agent.

21. The welding electrode as defined in claim 14, wherein said at least material to increase the surface tension includes a fluoride compound.

22. The welding electrode as defined in claim 14, wherein said end coating material includes at least one electrically conductive material.

23. The welding electrode as defined in claim 15, wherein said end coating material is at least partially coated on said flux coating.

24. The welding electrode as defined in claim 15, wherein said end coating material is a different color from said flux coating.

25. The welding electrode as defined in claim 15, wherein said end coating material has a lower viscosity when applied to said welding electrode than said flux coating when applied to said welding electrode.

26. A method for forming a weld bead on a workpiece having a reduced porosity comprising:
   a. providing a welding electrode having a metal core and an end coating material at least partially coated on a front end of said metal core, said end coating material only partially coating an outer surface of said welding electrode, said end coating extending from said front end up to about 4 inches from said front end of said welding electrode, said end coating material including at least one electrically conductive material; and,
   b. applying an electric current to said welding electrode to at least partially melt an end of said welding electrode thereby causing melted portions of said metal core to at least partially form the weld bead, at least one component of said end coating material at least partially protecting said melted portions of said metal core from oxygen, nitrogen, or combinations thereof.

27. The method as defined in claim 26, wherein said welding electrode includes a flux coating that is at least partially coated on an outer surface of said metal core, said flux coating including an electrically conductive material and a shielding material that at least partially shields a weld bead formed during a welding operation, said end coating material at least partially having a different composition from said flux coating.

28. The method as defined in claim 26, wherein said metal core is a solid metal rod.

29. The method as defined in claim 26, wherein said metal core includes a majority of iron.

30. The method as defined in claim 26, wherein said end coating material includes at least one material to increase the surface tension of said melted portions of said metal core.

31. The method as defined in claim 30, wherein said at least material to increase the surface tension includes a fluoride compound.

32. The method as defined in claim 26, wherein said electrically conductive material of said end coating includes a material selected from the group consisting of aluminum, graphite, iron, iron alloys, magnesium, titanium, or combinations thereof.

33. The method as defined in claim 27, wherein said end coating material is at least partially coated on said flux coating.

34. The method as defined in claim 27, wherein said end coating material is a different color from said flux coating.

35. The welding electrode as defined in claim 27, wherein said end coating material has a lower viscosity when applied to said welding electrode than said flux coating when applied to said welding electrode.

36. A method of manufacturing a welding electrode that forms a weld bead having a reduced porosity comprising:
   a. providing a metal rod to be used to form the core of the welding electrode; and,
   b. at least partially coating a front end of said metal rod with an end coating material, said end coating material only partially coating an outer surface of said welding electrode, said end coating extending from said front end up to about 4 inches from said front end of said metal rod, at least one component of said end coating material formulated to at least partially protect melted portions of said metal core from oxygen, nitrogen, or combinations thereof during a welding process, said end coating material including at least one electrically conductive material.

37. The method as defined in claim 36, wherein said metal rod is a solid metal rod.

38. The method as defined in claim 36, wherein said metal rod includes a majority of iron.

39. The method as defined in claim 36, wherein said end coating material includes at least one material to increase the surface tension of melted portions of said metal rod formed during a welding process.

40. The method as defined in claim 39, wherein said at least material to increase the surface tension includes a fluoride compound.

41. The method as defined in claim 36, wherein said electrically conductive material of said end coating includes a material selected from the group consisting of aluminum, graphite, iron, iron alloys, magnesium, titanium, or combinations thereof.

42. The method as defined in claim 36, wherein said step of applying said end coating material includes dipping said metal rod in said end coating material, spray coating said end coating material on said metal rod, brushing said end coating material on said metal rod, rolling said metal rod in said end coating material, or combinations thereof.

43. The method as defined in claim 36, including the step of applying a flux coating at least partially on said metal rod, said end coating material at least partially having a different composition from said flux coating.

44. The method as defined in claim 43, wherein said flux coating is applied to said metal rod prior to said end coating material being applied to said metal rod.

45. The method as defined in claim 43, wherein said flux coating is extruded on said metal rod.

46. The method as defined in claim 43, wherein said flux coating includes an electrically conductive material and a shielding material that at least partially shields a weld bead formed during a welding process.

47. The method as defined in claim 43, wherein said end coating material is at least partially coated on said flux coating.

48. The method as defined in claim 43, wherein said end coating material is a different color from said flux coating.

49. The method as defined in claim 43, wherein said end coating material has a lower viscosity when applied to said welding electrode than said flux coating when applied to said welding electrode.

50. The method as defined in claim 40, wherein said fluoride compound includes a compound selected from the group consisting of metal fluoride, metal oxide, metal carbonate, or mixtures thereof.

51. The method as defined in claim 36, wherein said electrically conductive material of said end coating material includes a material selected from the group consisting of aluminum, graphite, iron, iron alloys, magnesium, titanium, or combinations thereof.

* * * * *

UNITED STATES PATENT AND TRADEMARK OFFICE
CERTIFICATE OF CORRECTION

PATENT NO. : 7,087,859 B2  Page 1 of 1
APPLICATION NO. : 10/840701
DATED : August 8, 2006
INVENTOR(S) : Burt et al.

It is certified that error appears in the above-identified patent and that said Letters Patent is hereby corrected as shown below:

Col. 12, line 20   change "ending coating" to "end coating"

Signed and Sealed this

Eighteenth Day of November, 2008

JON W. DUDAS
*Director of the United States Patent and Trademark Office*